United States Patent
Ochs

(10) Patent No.: US 7,459,514 B2
(45) Date of Patent: *Dec. 2, 2008

(54) PROCESS FOR THE PREPARATION OF ORGANOPOLYSILOXANES HAVING SILANOL GROUPS

(75) Inventor: Christian Ochs, Burghausen (DE)

(73) Assignee: Wacker Chemie AG, Munich (DE)

(*) Notice: Subject to any disclaimer, the term of this patent is extended or adjusted under 35 U.S.C. 154(b) by 197 days.

This patent is subject to a terminal disclaimer.

(21) Appl. No.: 11/402,613

(22) Filed: Apr. 12, 2006

(65) Prior Publication Data

US 2006/0241268 A1    Oct. 26, 2006

(30) Foreign Application Priority Data

Apr. 21, 2005   (DE) ............... 10 2005 018 628

(51) Int. Cl.
  *C08G 77/06* (2006.01)
  *C08G 77/04* (2006.01)
  *C08G 77/12* (2006.01)

(52) U.S. Cl. .............. 528/15; 528/31; 528/33

(58) Field of Classification Search .......... 528/33
  See application file for complete search history.

(56) References Cited

U.S. PATENT DOCUMENTS

| | | | |
|---|---|---|---|
| 3,328,448 A | 6/1967 | Barnes et al. | |
| 3,504,006 A | 3/1970 | Modic | |
| 4,921,926 A * | 5/1990 | Motegi et al. | 528/17 |
| 4,975,510 A * | 12/1990 | Wegehaupt et al. | 528/21 |
| 5,272,225 A * | 12/1993 | Ogawa et al. | 525/477 |
| 5,639,844 A | 6/1997 | Blum et al. | |
| 5,900,438 A | 5/1999 | Miyoshi et al. | |
| 6,214,961 B1 * | 4/2001 | Aoki | 528/21 |
| 6,284,906 B1 * | 9/2001 | Paulasaari et al. | 556/451 |

FOREIGN PATENT DOCUMENTS

| | | |
|---|---|---|
| DE | 12 46 251 B | 8/1967 |
| JP | 09-104749 A | 4/1997 |
| JP | 2001-151889 A | 6/2001 |
| JP | 2002-154917 A | 5/2002 |
| JP | 2003-082102 A | 3/2003 |

OTHER PUBLICATIONS

Uchida et al. J. Am. Chem. Soc. 1990, 112, 7077-7079.*
Barnes G. H. et al. "The Preparation of Organosilanols via Metal-Catalyzed Reaction of Organosilicon Hybrides with Water", Journal of Organic Chemistry, American Chemical Society, Easton, US, vol. 31, 1966, pp. 885-887.
English Abstract corresponding to JP 09-104749A, 1997.
English Abstract corresponding to JP 2001-151889A, 2001.
English Abstract corresponding to JP 2002-154917A, 2002.
English Abstract corresponding to JP 2003-082102A, 2003.

* cited by examiner

*Primary Examiner*—Randy Gulakowski
*Assistant Examiner*—Robert Loewe
(74) *Attorney, Agent, or Firm*—Brooks Kushman P.C.

(57) ABSTRACT

A process for the preparation of organosilicon compounds bearing silanol groups, in particular linear polyorganosiloxanes bearing lateral silanol groups, in a predictable manner and high yield, comprising reacting a similarly constructed Si—H functional organosilicon compound with water in the presence of a Group VIII metal catalyst, optionally in the presence of a cocatalyst. Predictable product structure and very few byproducts are particularly advantageous.

11 Claims, No Drawings

PROCESS FOR THE PREPARATION OF ORGANOPOLYSILOXANES HAVING SILANOL GROUPS

BACKGROUND OF THE INVENTION

1. Field of the Invention

The invention relates to a process for the preparation of organopolysiloxanes having silanol groups, in particular for the preparation of linear organopolysiloxanes functionalized with lateral silanol groups.

2. Background Art

As is generally known, in the simplest case silanol groups can be prepared by the aqueous hydrolysis of SiCl-containing organosilicon compounds. While in the case of the monomeric silanes it is relatively easy to obtain defined silanols and to isolate them in pure form in this way, the analogous reaction for the synthesis of polymeric organosilicon compounds, in particular those having lateral silanol functionalization, is substantially more difficult. It is true that it is possible in principle to obtain polymers functionalized laterally with silanol groups by cohydrolysis of mixtures consisting of dialkyldichlorosilanes and alkyltrichlorosilanes and optionally trialkylchlorosilanes. However, the products are not defined compounds having a uniform structure but rather a random mixture of more or less strongly branched hydrolysis products which also have a minor proportion of silanol side groups. The targeted synthesis of organopolysiloxanes having lateral silanol groups is therefore not possible in this way.

In principle, a further method for the synthesis of organopolysiloxanes containing silanol groups is the acid- or base-catalyzed hydrolysis of SiH-functional siloxanes. However, those skilled in the art are aware that defined compounds having a uniform structure can rarely be obtained in this manner, since the course of the reaction is not specific. Rather, the dehydrocondensation of already formed silanol groups with SiH groups still present, equilibrations and fragmentations of the polymer main chain of the starting material and the condensation of silanol groups, likewise catalyzed by acids or bases, take place as secondary reactions simultaneously with the desired formation of the silanol groups. As a result, a random mixture of more or less highly branched and partly bridged polymers is therefore obtained.

The classical hydrolysis processes are therefore not suitable for selectively synthesizing organopolysiloxanes functionalized laterally with silanol groups.

SUMMARY OF THE INVENTION

It was an object of the invention to provide a process which does not have the abovementioned disadvantages, and which permits the selective synthesis of organopolysiloxanes functionalized laterally with silanol groups. These and other objects are achieved by the invention, whereby easily synthesized Si—H functional organosilicon compounds are reacted with water in the presence of a Group VIII metal catalyst.

DETAILED DESCRIPTION OF THE PREFERRED EMBODIMENT(S)

The invention thus relates to a process for the preparation of organosilicon compounds having silanol groups and comprising units of the general formula $$H_a(R'O)_b(OH)_cR_dSiO_{(4-a'-b-c-d)/2} \quad (I),$$

in which a' is 0 or 1, preferably 0,
b is 0 or 1, preferably 0,
c is 0 or 1,
d is 0, 1, 2 or 3,
R may be identical or different and are a monovalent, SiC-bonded, optionally substituted hydrocarbon radical having 1 to 18 carbon atoms, and
R' may be identical or different and are a monovalent, optionally substituted hydrocarbon radical which may be interrupted by heteroatoms, with the proviso that the sum a'+b+c+d is ≦3, that a' and c do not simultaneously have the value 1, and that the organosilicon compounds of the formula (I) have at least one Si-bonded OH group per molecule, by reacting organosilicon compounds (A) having SiH groups and comprising units of the general formula $$H_a(R'O)_bR_dSiO_{(4-a-b-d)/2} \quad (II),$$

in which
a is 0 or 1,
b, d, R and R' have the abovementioned meaning, with the proviso that the sum a+b+d is ≦3 and the sum a'+c is a, and that the organosilicon compounds of the formula (II) have at least one Si-bonded hydrogen atom per molecule, in the presence of catalysts (B) selected from the group consisting of the metals of subgroup VIII of the Periodic Table of the Elements and compounds thereof, optionally in the presence of cocatalysts (K), with water (C).

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as cyclopentyl, cyclohexyl, cycloheptyl and methylcyclohexyl radicals; aryl radicals such as the phenyl, naphthyl, anthryl and phenanthryl radicals; alkaryl radicals such as the o-, m-, and p-tolyl radicals, xylyl radicals and ethylphenyl radicals; and aralkyl radicals such as the benzyl radical and the α- and the β-phenylethyl radicals.

Examples of substituted radicals R are haloalkyl radicals such as the 3,3,3-trifluoro-n-propyl radical, the 2,2,2,2',2',2'-hexafluoroisopropyl radical and the heptafluoroisopropyl radical, and haloaryl radicals such as the o-, m- and p-chlorophenyl radicals.

The radical R is preferably a monovalent hydrocarbon radical having 1 to 6 carbon atoms, the methyl radical and the phenyl radical being particularly preferred.

Examples of radicals R' are the examples mentioned for radical R. Radical R' is preferably an alkyl radical having 1 to 8 carbon atoms which optionally may be interrupted by one or more heteroatoms, preferably ether oxygen atoms, separate from one another. The methyl, ethyl, propyl, butyl and 2-ethoxyethyl radicals are particularly preferred, in particular the methyl, ethyl and propyl radicals. Preferred heteroatoms are O, N, S, and P.

Preferably used organosilicon compounds (A) having SiH groups are those of the general formula

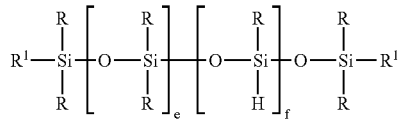
(III)

in which e is an integer from 0 to 1000, preferably from 80 to 500, preferably from 100 to 200, f is an integer from 1 to 200, preferably from 1 to 60, preferably from 1 to 16, most preferably from 1 to 6, $R^1$ is a hydrogen atom or R, and R has the meaning stated therefor above.

Preferably, the organopolysiloxanes of the general formula (III) have an average viscosity of from 10 to 100,000 mm²/s, more preferably from 25 to 10,000 mm²/s, and most preferably from 50 to 1000 mm²/s, at 25° C. The organopolysiloxanes (A) are commercial products or can be prepared by processes customary in silicone chemistry.

The metals of subgroup VIII of the Periodic Table of the Elements which are used as catalyst component (B), or compounds thereof, are preferably metals of the platinum group or their compounds, more preferably Ru, Rh, Ir, Pd and Pt or compounds thereof.

In the process of the invention, the catalysts (B) may be used as solids, as solutions in water or dissolved in any desired organic solvents, or bound to support materials. Catalysts (B) bound to support materials are preferred.

In principle, support materials may comprise all inorganic substances or organic polymers which are suitable for this purpose, for example, $SiO_2$, $Al_2O_3$, clays, activated carbon or organic resins. The catalyst support material is preferably active carbon or $Al_2O_3$, palladium/active carbon, palladium/$Al_2O_3$ and ruthenium/active carbon. In particular, palladium/active carbon, is preferred as component (B).

The amount of the catalyst (B) required depends on the number of SiH groups present in the organopolysiloxane (A). Preferably, the catalyst (B) is used in amounts of from 10 to 10,000 ppm, preferably from 20 to 1000 ppm, most preferably from 50 to 500 ppm, calculated as the metallic element, and based on the total weight of the organopolysiloxanes (A) used. The catalysts (B) used are commercial products or can be prepared by processes customary in organometallic chemistry.

Preferably, the catalyst bound to a support material is removed by filtration and optionally reused or recycled after the end of the reaction or at the end of the process according to the invention.

The cocatalysts (K) optionally used in the process according to the invention are protic, hydric or redox-labile compounds. Examples of suitable cocatalysts (K) are organic acids such as formic acid, acetic acid, oxalic acid, citric acid and ascorbic acid, and low molecular weight organosilicon hydrides, such as trimethylsilane, triethylsilane and tetramethyldisiloxane. The organosilicon hydrides preferably contain 5 silicon atoms or less, more preferably three silicon atoms or less, in particular one or two silicon atoms.

Preferred cocatalysts (K) are formic acid, acetic acid, oxalic acid, citric acid, ascorbic acid, triethylsilane and tetramethyldisiloxane, while formic acid, oxalic acid, ascorbic acid, triethylsilane and tetramethyldisiloxane are more preferred, and formic acid, triethylsilane and tetramethyldisiloxane are most preferred.

The amount of cocatalyst (K), when used, depends on the amount of the catalyst (B) used. Preferably, cocatalyst (K) is present in amounts of from 25 to 1000 mol %, more preferably from 50 to 500 mol %, and most preferably from 100 to 250 mol %, based on 100 mol % of metallic element in catalyst (B).

In the process of the invention, cocatalysts (K) can be used concomitantly. Cocatalysts (K) are preferably used concomitantly if, as organopolysiloxanes (A), those of the general formula (III) where $R^1$ has the meaning of R are employed, since the duration of the reaction can be considerably shortened thereby, in particular if lower SiH-functional compounds of the general formula (III) are used.

In the process of the invention, any desired type of water may be used as component (C), demineralized water, distilled water and purified water (Aqua purificata) being preferred, and demineralized water being particularly preferred.

The amount of component (C) used depends on the number of SiH groups present in the organopolysiloxane (A). Preferably, component (C) is used in an equimolar amount or in excess, based on the SiH groups present in the organopolysiloxane (A). The amount of water used is preferably from 100 to 200 mol %, more preferably from 100 to 150 mol %, and in particular, from 100 to 120 mol %, per 100 mol % of the SiH groups present in the organopolysiloxane (A).

Preferably obtained are organosilicon compounds having silanol groups of the general formula

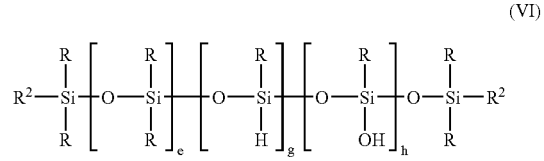
(VI)

in which $R^2$ is R or an OH group, g is from 0 to 199, preferably from 0 to 59, more preferably from 0 to 5, in particular 0, h is from 1 to 200, preferably from 1 to 60, more preferably from 1 to 6, with the proviso that the sum g+h is f (refer to general formula (III)), and R, e and f have the meaning stated therefor above.

The organopolysiloxanes of the general formula (IV) which are preferably obtained according to the invention have an average viscosity of from 10 to 100,000 mm²/s, more preferably from 25 to 10,000 mm²/s, most preferably from 50 to 1000 mm²/s, at 25° C.

In the context of this invention, the general formulae (III) and (IV) are to be understood as meaning that the units mentioned in each case and having the indices e and f in the formula (III) or e, g and h in the formula (IV) may be distributed in any desired manner, for example as a block or randomly, in the organopolysiloxane molecule.

In the process of the invention, the reaction is preferably carried out in a temperature range of from −10° C. to +150° C., more preferably from +10° C. to +100° C., most preferably from +25° C. to +80° C.

The process of the invention can be carried out with or without solvent (E), for example for homogenization or for reduction of the viscosity of the reaction mixture. The presence of solvent(s) is preferred. When solvent (E) is present, it is preferably a polar, organic solvent which increases the compatibility of water with the organopolysiloxane phase but does not itself react with the SiH groups present in the organosilicon compounds (A) and with the SiOH groups present in the reaction product (D). Examples of suitable solvents are tetrahydrofuran, dioxane and dimethoxyethane, with tetrahydrofuran or dioxane being preferred.

If solvent (E) is used, the amount is preferably from 1 to 500 parts by weight, more preferably from 5 to 200 parts by weight, and most preferably from 10 to 100 parts by weight, per 100 parts by weight of the organopolysiloxane (A).

The components (A), (B) and optionally (K) and optionally (E) may be in each case one type of component as well as a mixture of two or more types of the respective component. Furthermore, further substances (H) which do not participate directly in the reaction or which do not adversely affect the course of the reaction may be used in the process according to the invention. Examples of such further substances (H) are emulsifiers, phase transfer catalysts, preservatives, antimicrobial substances such as bactericides, fungicides or algicides, odorous substances, odor-inhibiting or odor-reducing substances, antifoams, rheology regulators, dyes, pigments, redox stabilizers, flame-retardant substances, light stabilizers and heat stabilizers. Preferably, no further substances (H) are used in the process according to the invention.

Furthermore, the process of the invention can be carried out as a homogeneous 1-phase reaction, as a multiphase reaction or in dispersion, for example, a micro- or macroemulsion. The homogeneous 1-phase reaction procedure is preferred.

If the process is carried out as a 2-phase reaction, which is not preferred, the best possible homogenization of the phases which are immiscible with one another and the creation of a large internal reaction surface should be ensured, for example by producing an average particle size of <500 μm. The thorough mixing of the reaction phases can be effected in principle by all mixing systems known in the art, for example, stirrers of all types, high-speed stirrers such as those obtainable under the brand Ultra-Turrax® or a similar dissolver system, by means of ultrasonic probes or baths, or for example, in a continuous reaction procedure, by means of static or dynamic mixing elements.

If the process is carried out in dispersion, which is likewise not preferred, emulsifiers or surface-active agents such as nonionic, anionic, cationic or amphoteric emulsifiers may accordingly be present, it being possible to prepare the dispersion in any desired manner known to those skilled in the art.

In the process of the invention, the components used are mixed with one another in a manner known per se and allowed to react. The components may be mixed with one another in any desired sequence, fed to the reaction and/or caused to react. In the case of a very exothermic reaction, however, metering of the component (C), optionally as a mixture with a component (E), into a mixture containing components (A), (B), optionally (K), optionally (E), and optionally (H), is preferred.

The process of the invention is preferably carried out at a pressure of the ambient atmosphere, i.e. approximately at from 900 to 1100 hPa, but it can also be carried out at higher and lower pressures, and can be carried out batchwise, semicontinuously or completely continuously in reactor systems suitable for such purposes, for example, batch reactors, batch reactor cascades, loop reactors, flow tubes, tubular reactors, microreactors, centrifugal pumps, and any desired combinations thereof.

After the end of the reaction, the reaction products obtained can be purified and/or isolated by any desired process steps. If desired, for example, volatile components, and optionally any solvent can be removed after the reaction by distillation, optionally under reduced pressure, and catalyst bound to support materials can be removed by filtration.

Moreover, the process according to the invention may be followed by any desired further process steps, by means of which the desired properties of the organosilicon compounds obtained by the process according to the invention can be adjusted in a targeted manner. The process steps are carried out in principle on the basis of the prior art and in the manner known to those skilled in the art.

The process of the invention has the advantages that it is simple and economical to carry out. A particular advantage is that it takes place quantitatively, extremely selectively, and virtually without secondary reactions. The desired organosilicon compounds funtionalized with silanol groups are therefore obtained in good yield and with high purity.

A further advantage of the process of the invention is that the catalyst (B) can be removed virtually completely in a simple manner by filtration, and consequently no undesired amounts of catalyst remain in the reaction product. In addition, the recovered catalyst can be worked up, reused and/or fed back to the circulation of useful materials. The process according to the invention is accordingly lastingly environmentally compatible, and sparing of resources.

The process according to the invention furthermore has the advantage that it is universally applicable, is equally suitable both for a continuous and batchwise procedure, and can be applied to a large number of SiH-functional organosilicon compounds, for example, to organopolysiloxanes and organosilicone resins.

In the examples described below, all parts given as percentages are based on weight, unless stated otherwise. Furthermore, all viscosities are based on a temperature of 20° C. Unless stated otherwise, the examples below are carried out at a pressure of the ambient atmosphere, i.e. at about 1000 hPa, and room temperature, i.e. at about 20° C., or at a temperature which is established on combining the reactants at room temperature without additional heating or cooling.

EXAMPLE 1

2 g of water and 100 g of a linear siloxane consisting of trimethylsilyloxy, dimethylsilyloxy and hydrogenmethylsilyloxy units, having an active hydrogen content of 0.085% and a viscosity of 95 mm$^2$/s, are dissolved in 70 g of tetrahydrofuran, and 0.25 g of palladium/active carbon (Pd/C, 10% by weight of palladium) is added. Heating to 70° C. and stirring for 5 hours at this temperature are effected, evolution of hydrogen taking place. Thereafter, all volatile constituents are removed by distillation at 80° C. in a full vacuum and the catalyst is separated by filtration. A colorless, clear product having a viscosity of 130 mm$^2$/s and a silanol group content of 84.9 mmol/100 g is obtained. NMR spectroscopy shows the quantitative formation of silanol groups bonded laterally to the siloxane main chain (29 Si-NMR: δ=about −56 to −58 ppm).

EXAMPLE 2

4.6 g of water and 400 g of a linear siloxane consisting of trimethylsilyloxy, dimethylsilyloxy and hydrogenmethylsilyloxy units, having an active hydrogen content of 0.051% and a viscosity of 250 mm$^2$/s, are dissolved in 280 g of tetrahydrofuran, and 1.04 g of palladium/active carbon (Pd/C, 10% by weight of palladium) and 0.104 g of triethylsilane are added. Stirring is effected at room temperature, the reaction mixture slowly warming up to about 30° C. with evolution of hydrogen. After the slightly exothermic reaction has ceased, further stirring is effected for 1 hour at 30° C., followed by heating to reflux temperature (about 70° C.), and the reaction is allowed to continue for a further 4 hours at this temperature. Thereafter, all volatile constituents are removed by distillation at 80° C. in a full vacuum and the catalyst is separated by filtration. A colorless, clear product having a viscosity of 290 mm$^2$/s and a silanol group content of 50.9 mmol/100 g is obtained. NMR spectroscopy shows the quantitative formation of silanol groups bonded laterally to the siloxane main chain.

EXAMPLE 3

13.4 g of water and 625 g of a linear siloxane consisting of hydrogendimethylsilyloxy, dimethylsilyloxy and hydrogenmethylsilyloxy units, having an active hydrogen content of 0.084% and a viscosity of 230 mm$^2$/s, are dissolved in 560 g of tetrahydrofuran, and 2.09 g of palladium/active carbon (Pd/C, 10% by weight of palladium) are added. Stirring is effected at room temperature, the reaction mixture slowly warming up to about 30° C. with evolution of hydrogen. After the slightly exothermic reaction has ceased, further stirring is effected for 1 hour at 30° C., followed by heating to reflux temperature (about 70° C.), and the reaction is allowed to continue for a further 2 hours at this temperature. Thereafter, all volatile constituents are removed by distillation at 80° C. in a full vacuum and the catalyst is separated by filtration. A colorless, clear product having a viscosity of 285 mm$^2$/s and a silanol group content of 84.1 mmol/100 g is obtained. NMR spectroscopy shows the quantitative formation of silanol groups bonded laterally and terminally to the siloxane main chain.

EXAMPLE 4

5.3 g of water and 250 g of a linear siloxane consisting of hydrogendimethylsilyloxy, dimethylsilyloxy and hydrogenmethylsilyloxy units, having an active hydrogen content of 0.084% and a viscosity of 230 mm$^2$/s, are dissolved in 225 g of tetrahydrofuran, and 0.85 g of palladium/active carbon (Pd/C, 10% by weight of palladium) and 37 mg of formic acid are added. Stirring is effected at room temperature, the reaction mixture slowly warming up to about 30° C. with evolution of hydrogen. After the slightly exothermic reaction has ceased, further stirring is effected for 1 hour at 30° C., followed by heating to reflux temperature (about 70° C.), and the reaction is allowed to continue for a further 2 hours at this temperature. Thereafter, all volatile constituents are removed by distillation at 80° C. in a full vacuum and the catalyst is separated by filtration. A colorless, clear product having a viscosity of 294 mm$^2$/s and a silanol group content of 84.0 mmol/100 g is obtained. NMR spectroscopy shows the quantitative formation of silanol groups bonded laterally and terminally to the siloxane main chain.

COMPARATIVE EXAMPLE 1

725 g of water are initially taken and cooled to about 0° C., and a mixture of 252.6 g of dimethyldichlorosilane, 2.17 g of trimethylchlorosilane and 2.99 g of methyltrichlorosilane is slowly added. After the end of the addition, heating to 30° C. and stirring for one hour at this temperature are effected. Thereafter, the siloxane phase is separated from the aqueous phase and freed from residual traces of water, dissolved HCl and short-chain, readily volatile hydrolysis constituents by distillation at 100° C. in a full vacuum. A viscous oil having a viscosity of about 2850 mm$^2$/s is obtained. Analysis of the reaction product by NMR spectroscopy shows the formation of a crosslinked polymer consisting of trimethylsilyloxy, dimethylsilyloxy, hydroxydimethylsilyloxy and methylsilyloxy units. On the other hand, the desired hydroxymethylsilyloxy units can be detected only in traces.

COMPARATIVE EXAMPLE 2

25 g of THF are added to 110 g of a linear siloxane consisting of trimethylsilyloxy, dimethylsilyloxy and hydrogenmethylsilyloxy units, having an active hydrogen content of 0.028% and a viscosity of 410 mm$^2$/s, the mixture is cooled to 0° C. and 0.6 g of water and 0.121 g of a 10% strength aqueous KOH are added at this temperature. Stirring is effected for 3 hours at this temperature, and the mixture is heated to 60° C. and allowed to react for a further 2 hours. Thereafter, 0.014 g of acetic acid (100%) is added and all volatile constituents are removed by distillation at 100° C. in a full vacuum. After filtration, a clear, colorless product having a viscosity of 150 mm$^2$/s is obtained. Analysis of the reaction product by NMR spectroscopy shows the formation of a mixture of partially crosslinked polymers consisting of trimethylsilyloxy, hydroxydimethylsilyloxy, dimethylsilyloxy, methylsilyloxy and (cyclo-trisiloxanyl)dimethylsilyloxy units. On the other hand, the formation of the desired hydroxymethylsilyloxy units is observed only to a minor extent.

COMPARATIVE EXAMPLE 3

25 g of THF are added to 110 g of a linear siloxane consisting of trimethylsilyloxy, dimethylsilyloxy and hydrogenmethylsilyloxy units, having an active hydrogen content of 0.028% and a viscosity of 410 mm$^2$/s, the mixture is cooled to 0° C. and 0.6 g of water and 0.08 g of a 10% strength aqueous HCl are added at this temperature. Stirring is effected for 3 hours at this temperature, and the mixture is heated to 60° C. and allowed to react for a further 2 hours. Thereafter, 0.044 g of triethylamine is added and all volatile constituents are removed by distillation at 100° C. in a full vacuum. After filtration, a clear, colorless product having a viscosity of 186 mm$^2$/s is obtained. Analysis of the reaction product by NMR spectroscopy shows the formation of a mixture of partially crosslinked polymers consisting of trimethylsilyloxy, hydroxydimethylsilyloxy, dimethylsilyloxy and methylsilyloxy units. On the other hand, the formation of the desired hydroxymethylsilyloxy units is observed only to a minor extent.

EXAMPLE 5

1.1 g of water and 100 g of a linear siloxane consisting of trimethylsilyloxy, dimethylsilyloxy and hydrogenmethylsilyloxy units, having an active hydrogen content of 0.051% and a viscosity of 245 mm$^2$/s, are dissolved in 70 g of tetrahydrofuran, and 0.26 g of palladium/active carbon (Pd/C, 10% by weight of palladium) is added. Furthermore, an equimolar amount (based on the amount of metallic palladium in the Pd/C) of cocatalyst according to the table is added to the reaction mixture. Stirring is effected at room temperature, the reaction mixture slowly warming up to about 25 to 30° C. with evolution of hydrogen. Thereafter, heating is effected to reflux temperature (about 70° C.) and the reaction is allowed to continue for a further 2 hours at this temperature, the conversion with respect to SiH in the reaction being monitored by NMR spectroscopy (cf. table). Thereafter, all volatile constituents are removed by distillation at 80° C. in a full vacuum and the catalyst is separated off by filtration. A colorless, clear product having silanol groups bonded laterally to the siloxane main chain is obtained in each case.

TABLE

|  | 5a | 5b | 5c | 5d | 5e | 5f |
|---|---|---|---|---|---|---|
| Cocatalyst | — | Formic acid | Acetic acid | Oxalic acid dihydrate | Triethylsilane | 1,1,3,3-Tetra-methyl-disiloxane |
| Amount (mg) | — | 11.3 | 14.6 | 30.8 | 26.0 | 16.4 |
| Conversion after 1 h/30° C. | 34% | 87% | 49% | 72% | 62% | 83% |
| Conversion after 1 h/70° C. | 65% | 100% | 91% | 100% | 85% | 100% |
| Conversion after 2 h/70° C. | 87% | 100% | 98% | 100% | 100% | 100% |
| Product viscosity [mm²/s] | 305 | 315 | 310 | 314 | 316 | 318 |
| SiOH content in the product [mmol/100 g] | 44.3 | 51.1 | 51.0 | 50.8 | 51.0 | 50.9 |

EXAMPLE 6

1.7 g of water and 100 g of a linear siloxane consisting of trimethylsilyloxy, dimethylsilyloxy and hydrogenmethylsilyloxy units, having an active hydrogen content of 0.085% and a viscosity of 95 mm²/s, are dissolved in 65 g of tetrahydrofuran, and 0.125 g of palladium/active carbon (Pd/C, 10% by weight of palladium) and 28 mg of formic acid are added. Heating to 70° C. and stirring for 3 hours at this temperature are effected, evolution of hydrogen taking place. Thereafter, all volatile constituents are removed by distillation at 80° C. in a full vacuum and the catalyst is separated off by filtration. A colorless, clear product having a viscosity of 126 mm²/s and a silanol group content of 84.7 mmol/100 g is obtained. NMR spectroscopy shows the quantitative formation of silanol groups bonded laterally to the siloxane main chain.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for the preparation of organosilicon compounds having silanol groups, of the formula

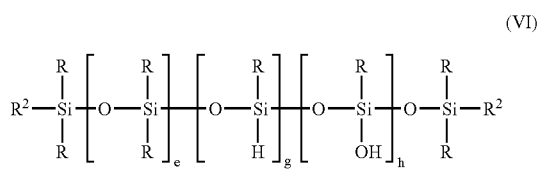

wherein
e is from about 80 to about 1000,
g is from 0 to 199,
h is from 1 to about 200,
R each are identical or different monovalent, SiC bonded, optionally substituted $C_{1-18}$ hydrocarbon radicals,
$R^2$ is R or —OH,
and the sum of g+h is f, comprising reacting an organopolysiloxane (A) having SiH groups, of the formula

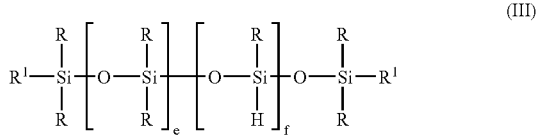

wherein
e is from 80 to 1000,
f is from 1 to about 200,
$R^1$ is hydrogen or R,
with
water (C)
in the presence of
at least one catalyst (B) selected from the group consisting of metals of subgroup VIII of the Periodic Table of Elements and compounds thereof,
further in the presence of
at least one cocatalyst (K) comprising an organic acid, a low molecular weight organosilicon hydride, or a mixture thereof.

2. The process of claim 1, wherein the organopolysiloxanes (A) having Si—H groups, have the formula

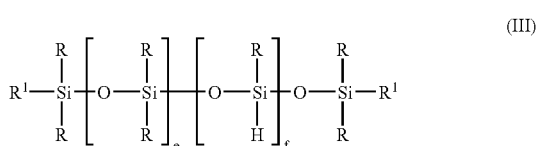

in which
e is an integer from 100 to 200,
f is an integer from 1 to 60, and
$R^1$ is a hydrogen atom or R.

3. The process of claim 1, wherein the organosilicon compounds having silanol groups comprise units of the formula

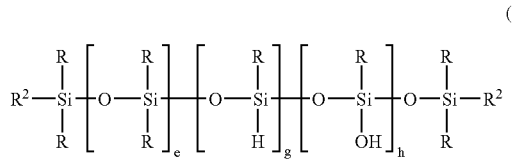 (VI)

in which
R² is R or an OH group, and
e is from 100 to 200.

4. The process of claim 3, wherein g is 0.

5. The process of claim 1, wherein catalysts (B) bound to a support material are used.

6. The process of claim 5, wherein at least one support material is selected from the group consisting of $SiO_2$, $Al_2O_3$, clays, active carbon, and organic resins.

7. The process of claim 1, wherein catalysts (B) are selected from the group consisting of palladium, platinum, rhodium, ruthenium, iridium, compounds thereof, and mixtures thereof.

8. The process of claim 1, wherein palladium bound to active carbon is used as catalyst (B).

9. The process of claim 1, wherein at least one cocatalyst (K) is selected from the group consisting of organic acids and low molecular weight organosilicon hydrides containing from 1 to about 5 silicon atoms.

10. The process of claim 1, wherein at least one cocatalysts (K) is selected from the group consisting of formic acid, acetic acid, oxalic acid, citric acid, ascorbic acid, triethylsilane, and tetramethyldisiloxane.

11. The process of claim 1, wherein the organosilicon compound containing silanol groups also contains at least one —OR group bonded to silicon.

* * * * *